US009697835B1

(12) United States Patent
Kuo et al.

(10) Patent No.: US 9,697,835 B1
(45) Date of Patent: Jul. 4, 2017

(54) ACOUSTIC MODEL TRAINING

(71) Applicant: International Business Machines Corporation, Armonk, NY (US)

(72) Inventors: Hong-Kwang J. Kuo, Pleasantville, NY (US); Lidia L. Mangu, New York, NY (US); Samuel Thomas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/086,949

(22) Filed: Mar. 31, 2016

(51) Int. Cl.
*G10L 15/02* (2006.01)
*G10L 15/04* (2013.01)
*G10L 15/06* (2013.01)
*G10L 15/26* (2006.01)

(52) U.S. Cl.
CPC ............ *G10L 15/26* (2013.01); *G10L 15/02* (2013.01); *G10L 15/04* (2013.01); *G10L 15/063* (2013.01)

(58) Field of Classification Search
CPC ......... G10L 15/02; G10L 15/04; G10L 15/06; G10L 15/063
See application file for complete search history.

(56) References Cited

U.S. PATENT DOCUMENTS

| 5,850,627 A | 12/1998 | Gould et al. |
| 5,909,666 A | 6/1999 | Gould et al. |
| 6,067,514 A * | 5/2000 | Chen ................ G10L 15/18 704/235 |
| 6,421,645 B1 * | 7/2002 | Beigi ............... G06F 17/30746 704/251 |
| 6,832,189 B1 * | 12/2004 | Kanevsky ............. G10L 15/07 704/235 |

(Continued)

OTHER PUBLICATIONS

Tomalin, Marcus, and Philip C. Woodland. "Discriminatively trained Gaussian mixture models for sentence boundary detection." Acoustics, Speech and Signal Processing, 2006. ICASSP 2006 Proceedings. 2006 IEEE International Conference on. vol. 1. IEEE, 2006.*

(Continued)

*Primary Examiner* — Brian Albertalli
(74) *Attorney, Agent, or Firm* — Steven F. McDaniel (57) ABSTRACT

A method, executed by a computer, includes receiving a channel recording corresponding to a conversation, receiving a transcription for the conversation, generating a conversation-specific language model for the conversation using the transcription, and conducting speech recognition on the channel recording using the conversation-specific language model to provide time boundaries and written language corresponding to utterances within the channel recording. The method further includes determining sentence or phrase boundaries for the transcription, aligning written language within the one or more transcriptions with the written language corresponding to the utterances with the channel recording to provide sentence or phrase boundaries for the channel recording, and training a speech recognizer according to the sentence or phrase boundaries for the transcription and the sentence or phrase boundaries for the channel recording. A computer system and computer program product corresponding to the method are also disclosed herein.

16 Claims, 9 Drawing Sheets

(56) References Cited

U.S. PATENT DOCUMENTS

| | | | | |
|---|---|---|---|---|
| 7,231,351 | B1* | 6/2007 | Griggs | G10L 15/26 704/243 |
| 7,668,718 | B2 | 2/2010 | Kahn et al. | |
| 8,131,545 | B1* | 3/2012 | Moreno | G10L 15/04 704/235 |
| 8,560,327 | B2* | 10/2013 | Neubacher | G06F 17/241 704/231 |
| 2009/0063150 | A1* | 3/2009 | Nasukawa | G10L 15/26 704/253 |
| 2009/0265166 | A1* | 10/2009 | Abe | G10L 15/04 704/201 |
| 2010/0076761 | A1* | 3/2010 | Juergen | G10L 15/197 704/235 |
| 2010/0104087 | A1* | 4/2010 | Byrd | H04M 3/42221 379/265.09 |
| 2010/0332225 | A1* | 12/2010 | Arrowood | G10L 15/26 704/235 |
| 2011/0040559 | A1* | 2/2011 | Kim | G10L 15/265 704/231 |
| 2013/0253932 | A1* | 9/2013 | Ariu | G10L 15/22 704/246 |
| 2014/0039887 | A1* | 2/2014 | Dzik | G10L 15/26 704/235 |
| 2015/0149162 | A1* | 5/2015 | Melamed | G10L 15/07 704/231 |
| 2016/0365090 | A1* | 12/2016 | Nissan | G10L 15/19 |

OTHER PUBLICATIONS

Kuo et al., "Acoustic Model Training", U.S. Appl. No. 15/154,108, filed May 13, 2016, 35 pages.

IBM Appendix P, list of patents and patent applications treated as related, May 13, 2016, 2 pages.

IBM et al., "Providing Help to Users during Recording of Training Materials for a Speech Recognition System", An IP.com Prior Art Database Technical Disclosure, Original Publication Date: Mar. 1, 1993, Original Disclosure Information: TDB v36 n3 Mar. 1993 p. 307-308, IP.com No. 000104147, 3 pages.

IBM et al., "Utilizing Inter Document Redundancy to Create Training Instances for Unsupervised Training of an Automatic Speech Recognizer", An IP.com Prior Art Database Technical Disclosure, Original Publication Date: Feb. 27, 2009, IP.com No. 000179840, 4 pages.

Lamel et al., "Lightly Supervised and Unsupervised Acoustic Model Training", Article Submitted to Computer Speech and Language, published in Jan. 2002, Spoken Language Process Group, CNRS-LIMSI, BP 133, 91403 Orsay Cdex, France, 19 pages.

Long et al., "Improving Lightly Supervised Training for Broadcast Transcription", Cambridge University Engineering Dept, Trumpington St., Cambridge, CB2 1PZ U.K., printed on Jan. 25, 2016, 5 pages.

Mell et al., "The NIST Definition of Cloud Computing", National Institute of Standards and Technology U.S. Department of Commerce, Special Publication 800-145, Sep. 2011, 7 pages.

Nguyen et al, "Light Supervision in Acoustic Model Training", BBN Technologies, 10 Moulton St., Cambridge, MA 02138, USA, © 2004 IEEE, ICASSP 2004, 4 pages.

Saon et al., "Data-Driven Approach to Designing Compound Words for Continuous Speech Recognition", IEEE Transaction on Speech and Audio Processing, vol. 9, No. 4, May 2001, © 2001 IEEE, 6 pages.

* cited by examiner

| Customer Service Agent | Customer 300 |
|---|---|
| this is xyz company how may i help you? | |
| | hello i placed an order last monday i still haven't received it |
| i'm sorry to hear that could you give me your order number | |
| | it's 5 3 2 1 7 9 6. |
| please hold<br>[hold music]<br>[infomercial]  } 310<br>[hold music]<br>hello | |
| | yes |
| i tracked down your order it's sitting at the local post office on peach hill road they tried to deliver it but needed your signature you should have received a slip | |
| | no i didn't |
| i can put in a request for them to re-deliver or you can pick it up today at the post office | |
| | i'll pick it up thank you |

A: This is xyz company. How may I help you?
B: Hello, I placed an order last Monday. I still haven't received it.
A: I'm sorry to hear that. Could you give me your order number?
322 ⌇B: It's 5 3 2 1 7 9 6.
A: Please hold.
B: Okay, sure.
322 ⌇A: Hello?
B: Yes.
A: I tracked down your order. It's sitting at the local post office on peach hill road. They tried to deliver but needed your signature. You should have received a slip.
B: No I didn't.
A: I can put in a request for them to re-deliver, or you can pick it up today at the post office.
B: I'll pick it up – thank you.

FIG. 3B

Customer Service Agent (Speaker 'A')

this is xyz company how may i help you i'm sorry to hear that could you give me your order number please hold <u>your satisfaction is important to us can't find rare part we will help you tracked down your order for you to</u> ← 332
<u>complete your project hello</u> [i] tracked down your order it's sitting at the
334
local post office on peach hill road they tried to deliver but needed your signature you should have received a slip i can put in a request for them to re-deliver or you can pick it up today at the post office.

Customer (Speaker 'B')

hello i placed an order last monday i still haven't received it it's 5 3 2 1 7 9 6 okay sure yes i didn't i'll pick it up thank you

FIG. 3C

```
<beg:A_0001> This is xyz company <end:A_0001>
<beg:A_0002> How may I help you <end:A_0002>
<beg:B_0001> Hello, I placed an order last Monday <end:B_0001>
<beg:B_0002> I still haven't received it <end:B_0002>
<beg:A_0003> I'm sorry to hear that <end:A_0003>
<beg:A_0004> Could you give me your order number <end:A_0004>
<beg:B_0003> It's 5 3 2 1 7 9 6 <end:B_0003>
<beg:A_0005> Please hold <end:A_0005>
<beg:B_0004> Okay, sure <end:B_0004>
<beg:A_0006> Hello <end:B_0006>
<beg:B_0005> Yes <end:B_0005>
<beg:A_0007> I tracked down your order <end:A_0007>
<beg:A_0008> It's sitting at the local post office on peach hill road<end:A_0008>
<beg:A_0009> They tried to deliver but needed your signature <end:A_0009>
<beg:A_0010> You should have received a slip <end:A_0010>
<beg:B_0007> No I didn't <end:B_0007>
<beg:A_0011> I can put in a request for them to re-deliver <end:A_0011>
<beg:A_0012> or you can pick it up today at the post office <end:A_0012>
<beg:B_0008> I'll pick it up <end:B_0008>
<beg:B_0009> thank you <end:B_0009>
```

FIG. 3D

```
                                                                    410
       <beg:A_0001> this is xyz company <end:A_0001>               ✓
       <beg:A_0002> how may i help you <end:A_0002>
342 ⌒⌐<beg:B_0001> hello i placed an order last monday <end:B_0001>⌐⌒ 342
       <beg:B_0002> i still haven't received it <end:B_0002>
       <beg:A_0003> i'm sorry to hear that <end:A_0003>
       <beg:A_0004> could you give me your order number <end:A_0004>
       <beg:B_0003> it's 5 3 2 1 7 9 6 <end:B_0003>
       <beg:A_0005> please hold <end:A_0005>
       <beg:B_0004> okay sure <end:B_0004>
       -->> your satisfaction is important to us can't find rare part we'll help you
       tracked down your order for you to complete your project        ⟵ 332
       <beg:A_0006> hello <end:A_0006>
       <beg:B_0005> yes <end:B_0005>
334 ⎯⎯⎯<beg:A_0007>-[i] tracked down your order <end:A_0007>
       <beg:A_0008> it's sitting at the local post office on peach hill road
       <end:A_0008>
342 ⌒⌐<beg:A_0009> they tried to deliver but needed your signature<end:A_0009>⌐⌒ 342
       <beg:A_0010> you should have received a slip <end:A_0010>
       <beg:B_0007> no i didn't <end:B_0007>
       <beg:A_0011> i can put in a request for them to re-deliver <end:A_0011>
       <beg:A_0012> or you can pick it up today at the post office <end:A_0012>
       <beg:B_0008> i'll pick it up <end:B_0008>
       <beg:B_0009> thank you <end:B_0009>
```

FIG. 4A

Channel A = Customer Service Agent  
Channel B = Customer

| Channel+ID | Start Time | End Time | Spoken Sentence or Phrase |
|---|---|---|---|
| A_0001 | 0.312 | 2.145 | This is xyz company |
| A_0002 | 2.253 | 3.370 | How may I help you |
| A_0003 | 9.311 | 11.083 | I'm sorry to hear that |
| A_0004 | 11.339 | 13.527 | Could you give me your order number |
| A_0005 | 18.571 | 19.875 | Please hold |
| A_0006 | 40.123 | 40.976 | Hello |
| A_0007 | 42.391 | 43.857 | I tracked down your order |
| A_0008 | 44.128 | 47.490 | It's sitting at the local post office on peach hill road |
| A_0009 | 47.632 | 50.516 | They tried to deliver but needed your signature |
| A_0010 | 50.774 | 51.902 | You should have received a slip |
| A_0011 | 54.439 | 57.147 | I can put in a request for them to re-deliver |
| A_0012 | 57.358 | 59.701 | or you can pick it up today at the post office |
| | | | |
| B_0001 | 3.512 | 7.345 | Hello, I placed an order last Monday |
| B_0002 | 7.576 | 9.103 | I still haven't received it |
| B_0003 | 13.804 | 18.192 | It's 5 3 2 1 7 9 6 |
| B_0004 | 20.064 | 21.128 | Okay, sure |
| B_0005 | 41.283 | 42.017 | Yes |
| B_0006 | 52.551 | 54.147 | No I didn't |
| B_0007 | 59.972 | 61.018 | I'll pick it up |
| B_0008 | 61.319 | 62.297 | thank you |

ACOUSTIC MODEL TRAINING

BACKGROUND OF THE INVENTION

The present invention relates generally to the field of speech recognition, and more particularly to speech recognition training including acoustic model training.

Speech recognizers convert speech (i.e., spoken language) to written language and typically use an acoustic model to represent the relationship between an audio signal and the phonemes or other linguistic units that make up speech. Typically, acoustic models are created from training data that includes a set of audio recordings and their corresponding transcripts.

SUMMARY

As disclosed herein, a method, executed by a computer, includes receiving a channel recording corresponding to a conversation, receiving a transcription for the conversation, generating a conversation-specific language model for the conversation using the transcription, and conducting speech recognition on the channel recording using the conversation-specific language model to provide time boundaries and written language corresponding to utterances within the channel recording. The method further includes determining sentence or phrase boundaries for the transcription, aligning written language within the one or more transcriptions with the written language corresponding to the utterances with the channel recording to provide sentence or phrase boundaries for the channel recording, and training a speech recognizer according to the sentence or phrase boundaries for the transcription and the sentence or phrase boundaries for the channel recording. A computer system and computer program product corresponding to the method are also disclosed herein.

BRIEF DESCRIPTION OF THE DRAWINGS

FIG. 3C is a text diagram depicting one example of a recognized conversation in accordance with at least one embodiment of the present invention;

FIG. 3D is a text diagram depicting one example of a delimited transcription in accordance with at least one embodiment of the present invention;

DETAILED DESCRIPTION

The embodiments disclosed herein recognize that acoustic model training for speech recognizers may be speaker and channel dependent and is preferably conducted on sentence or phrase level speech segments (e.g., time boundaries within an audio recording) along with transcription segments corresponding to the speech segments. However, transcribers typically create transcriptions without providing time boundaries for the audio recordings. For example, in a call with two channels (e.g., a representative and customer), a human transcriber may accurately transcribe the interactive conversation captured in one or more audio recordings including punctuation marks for phrases and sentences. However, transcribers typically do not capture the time boundaries of each utterance (e.g., each word or phrase) within the audio recordings. In addition, human transcribers are apt to completely ignore and not transcribe audio segments that are not meaningful, such as music and infomercials played while the customer is on hold. Consequently, such transcripts and recordings are generally not suitable for acoustic model training without additional manually intensive preparation by linguists or audio technicians.

The embodiments disclosed herein also recognize that manual segmentation of audio recordings into sentences or phrases is labor intensive and that silence-based automatic segmentation of audio recordings results in inconsistent intervals of speech and is highly speaker-dependent. Furthermore, the intervals of speech generated by silence-based automatic segmentation may be unrelated to the underlying phrase or sentence structure and can be inordinately long (e.g., encompassing multiple sentences). Long intervals of speech can dramatically slow down some forms of speech training such as discriminative sequence training that uses alternative word lattice hypotheses. In addition, some types of neural network acoustic models such as "Long Short-Term Memory" (LSTM) prefer training data delimited by sentence boundaries and not arbitrary segments from silence-based automatic segmentation. Various embodiments, that address at least some of the above issues, are disclosed herein and will now be described in reference to the Figures.

Figure 1:
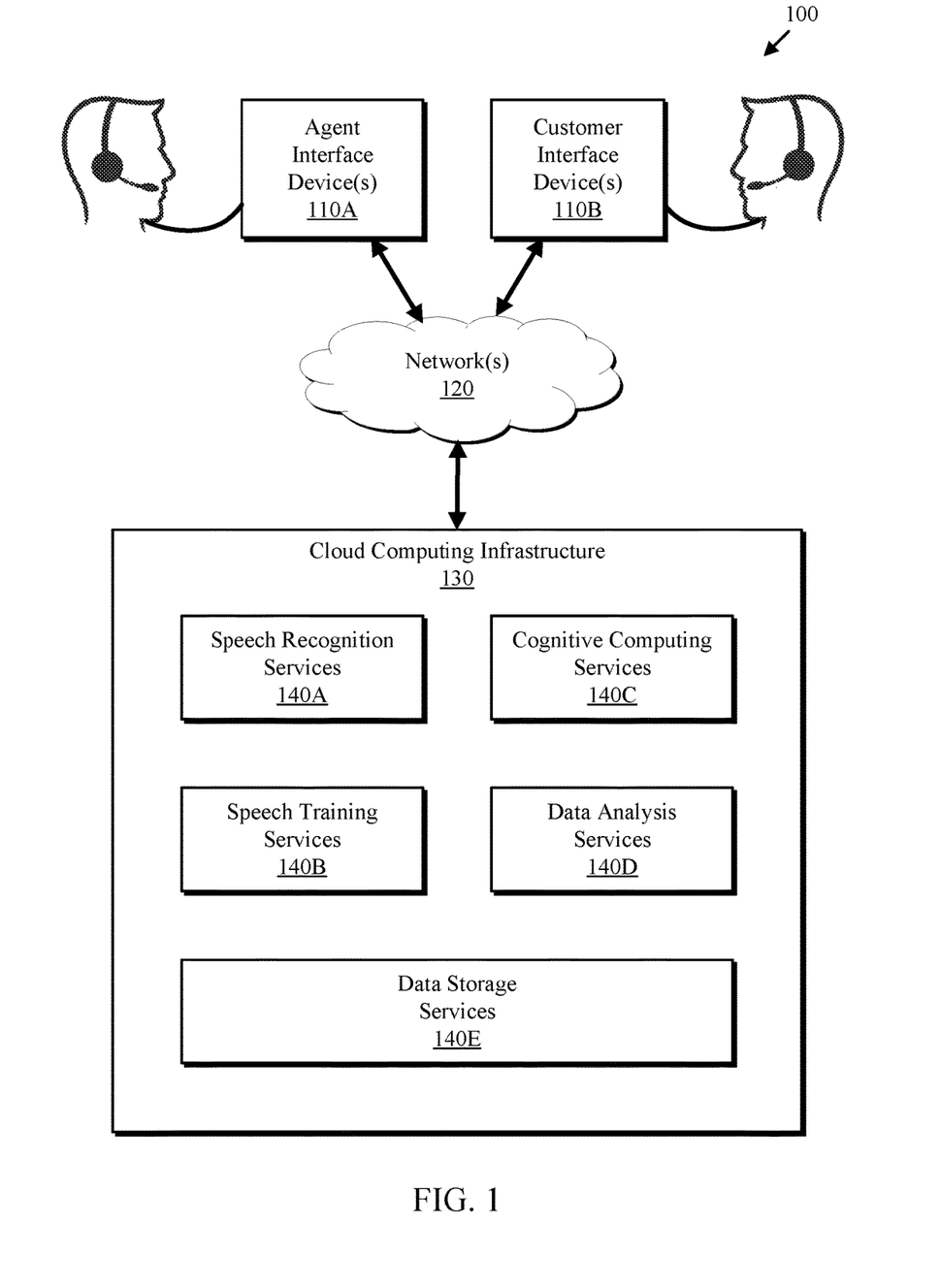
FIG. 1 is a block diagram depicting one example of a speech recognition environment wherein at least one embodiment of the present invention may be deployed.

FIG. 1 is a block diagram depicting one example of a speech recognition environment 100 wherein at least one embodiment of the present invention may be deployed. As depicted, the speech recognition environment 100 includes one or more user interface devices 110, networks 120, a cloud computing infrastructure 130 and various cloud services 140. The speech recognition environment 100 enables speech recognition of conversations between users of the user interface devices 110.

The user interface devices 110 may enable users to communicate with one another via verbal communications. Examples of the user interface devices include phones, mobile phones, or computing devices with audio (e.g., speech) input capabilities. The user interface devices 110 may also support data communication over the networks 120. Examples of the networks 120 include telephone networks and computer networks including intra-networks and inter-networks. In the depicted embodiment, a customer service agent using the interface device(s) 110A is able access the services 140 hosted by the cloud computing infrastructure 130 concurrent with conversing with a customer via the interface devices 110B.

In the depicted embodiment, the services 140 include speech recognition services 140A, speech training services 140B, cognitive computing services 140C and data analysis services 140D. By leveraging the speech recognition services 140A, users (including both agents and customers) may be able to use natural language to access other services without requiring the use of a computer or display. For example, the natural conversation between the customer and agent that is output by the speech recognition services may be analyzed by the cognitive computing services 140C in order to determine solutions and products that are relevant to the customer's issues. The agent can use these suggestions to help the customer.

One challenge in using speech to access services is that speech recognition accuracy may be reduced due to speaker and channel variations. The embodiments disclosed herein (e.g., speech training services 140B) facilitate using audio recordings captured during actual agent/customer interactions to train a speech recognizer rather than using a controlled corpus of speech utterances recorded for test subjects and segmented and marked by linguists or audio technicians. By using recordings captured during actual agent/customer interactions, speaker and channel variations may be effectively accounted for. Consequently, other services 140 such as the cognitive computing services 140C and data analysis services 140D may be effectively accessed by users using conventional conversational language. As a result, users may be provided with relevant information provided by the services 140 without requiring the manual entry of text into data access tools or the like.

Figure 2:
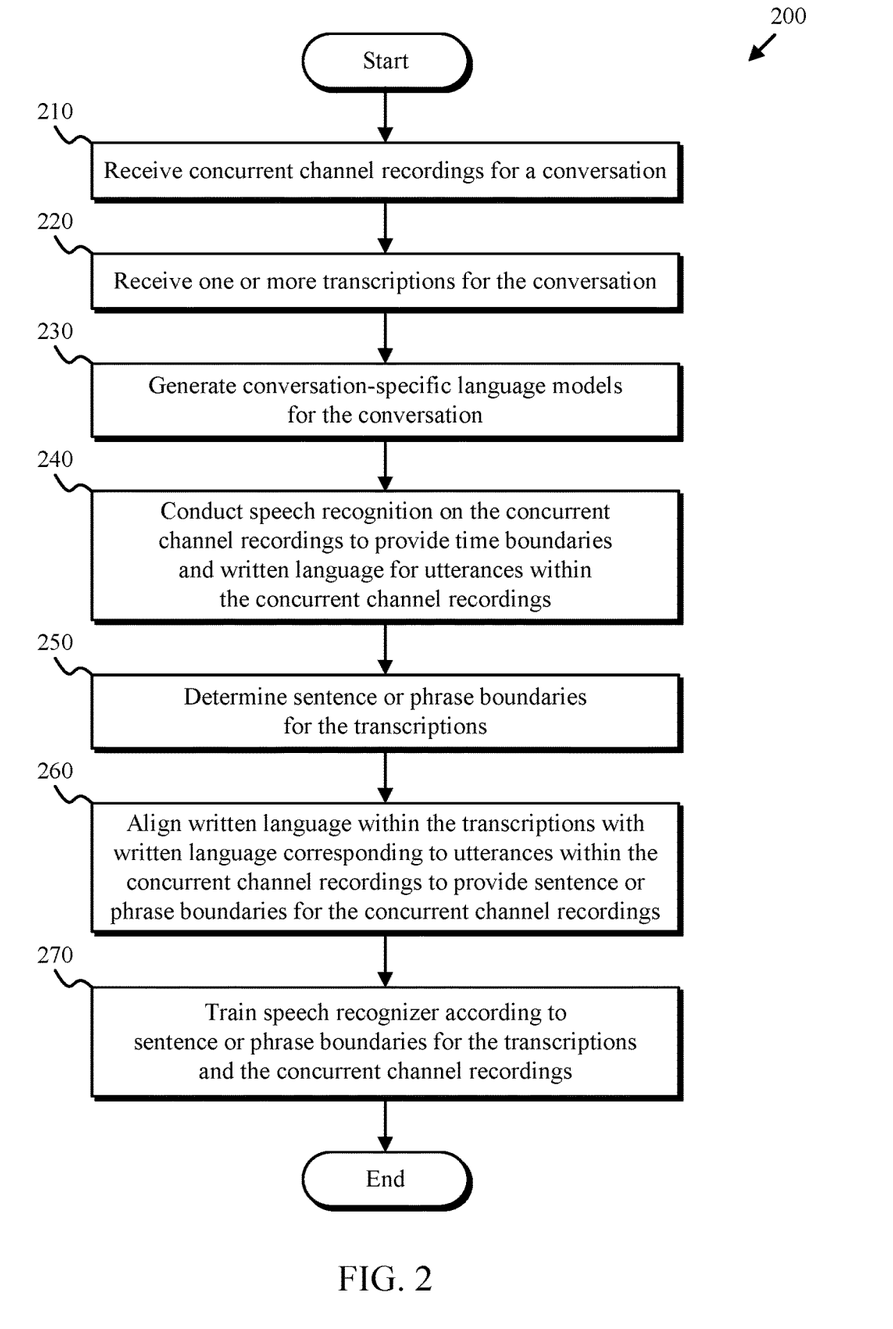
FIG. 2 is a flowchart depicting one example of a speech recognition training method in accordance with at least one embodiment of the present invention.

FIG. 2 is a flowchart depicting one example of a speech recognition training method 200 in accordance with at least one embodiment of the present invention. As depicted, the speech recognition training method 200 includes receiving (210) concurrent channel recordings for a conversation, receiving (220) one or more transcriptions for the conversation, generating (230) conversation-specific language models, conducting (240) speech recognition, determining (250) sentence or phrase boundaries, aligning (260) written language, and training (270) a speech recognizer. The speech recognition training method 200 enables training of a speech recognizer without requiring human identification of the time boundaries of utterances.

Figure 3A:
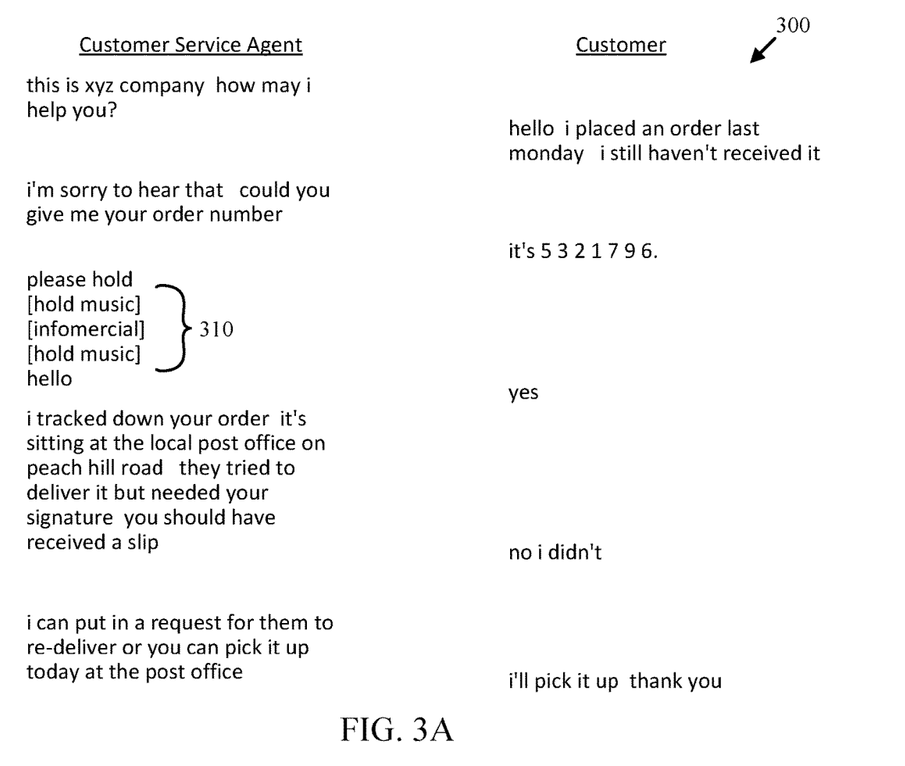
FIG. 3A is a text diagram depicting one example of a conversation in accordance with at least one embodiment of the present invention.

Receiving (210) concurrent channel recordings for a conversation may include receiving one or more recordings that capture a conversation between two or more participants. In some embodiments, each participant corresponds to a separate channel within a multi-channel recording. For example, a stereo recording may capture the speech of one user in the left channel and another user in the right channel. In other embodiments, each participant corresponds to a separate recording of the same conversation. Each recording may capture speech from a particular participant with minimal crosstalk from the other participants. An example of a conversation is depicted in FIG. 3A and discussed in the associated description.

Figure 3B:
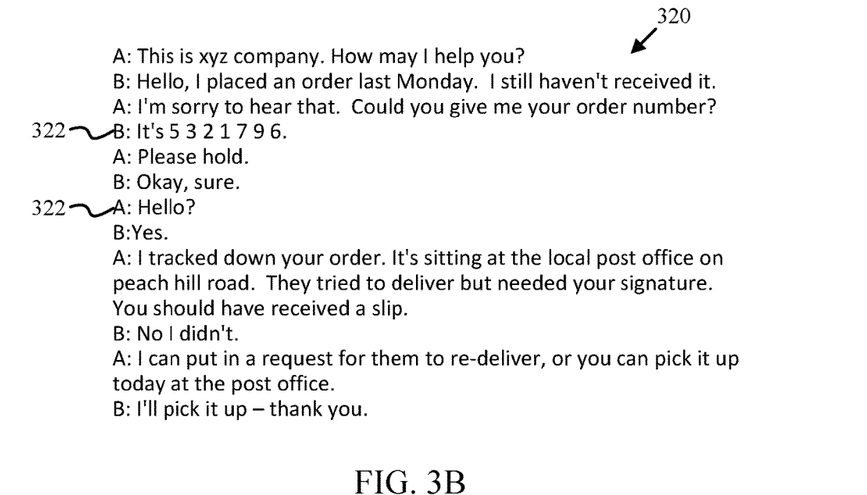
FIG. 3B is a text diagram depicting one example of an interleaved transcription for a conversation in accordance with at least one embodiment of the present invention.

Receiving (220) one or more transcriptions for the conversation may include obtaining one or more transcriptions of the conversation created by one or more transcribers. In some embodiments, the transcribed speech of all the users is contained within a single (interleaved) transcription and sections of speech are prepended with user identifiers. An example of an interleaved transcription is shown in FIG. 3B and discussed in the associated description. In other embodiments, a separate transcription is obtained for each participant in the conversation.

Generating (230) conversation-specific language models may include training a language model using the transcription(s) for the conversation. A separate language model may be generated for each participant in the conversation. In some embodiments, the conversation-specific language models comprise a first conversation-specific language model corresponding to a first channel recording (that corresponds to a first participant in a conversation) and a second conversation-specific language model corresponding to a second channel recording (that corresponds to a second participant in the conversation). The language models may be highly biased toward the precise sequences of words within the portions of the transcription(s) that correspond to the particular user. In some embodiments, the conversation-specific language models are n-gram language models where n is greater than or equal to 6.

Conducting (240) speech recognition may include conducting speech recognition on the concurrent channel recording(s) using the conversation-specific language models to provide time boundaries for utterances within the concurrent channel recording(s). Using speech recognition eliminates the need for manual segmentation and marking of audio recordings. In some embodiments, the speech recognizer used in operation 240 interpolates between the conversation-specific language models and a general (e.g., unbiased) language model. Interpolating with a general language model improves recognition in audio segments, such as infomercials, that do not correspond to the transcribed text used to generate the conversation-specific language models. As a result, erroneous recognition of phrases from the transcripts within those segments may be significantly reduced.

Determining (250) sentence or phrase boundaries may include determining sentence or phrase boundaries for the one or more transcriptions. The sentence or phrase boundaries may be determined by detecting punctuation in the transcription(s) and/or by conducting grammatical analysis of the transcription(s). An example of a transcription with phrase boundaries inserted therein is shown in FIG. 3D and described in the associated description.

Aligning (260) written language may include aligning written language within the one or more transcriptions with written language (e.g., the recognized speech provided by operation 240) corresponding to utterances within the concurrent channel recordings to provide sentence or phrase boundaries for the concurrent channel recordings. In some embodiments, aligning written language comprises conducting a dynamic programming procedure on the words within the one or more transcriptions and the words within the recognized speech.

One benefit of aligning written language is that the sentence or phrase boundaries within the transcription may be mapped to corresponding utterance (e.g., word) boundaries in the audio recordings. Consequently, sentence or phrase boundaries for the concurrent channel recordings may be determined without manual segmentation or silence-based automatic segmentation of the concurrent channel recordings.

Training (270) a speech recognizer may include training a speech recognizer according to the sentence or phrase boundaries for the one or more transcriptions and the sentence boundaries for the concurrent channel recordings. For example, an acoustic model for a specific speaker and channel may be trained using a concurrent channel recording and a transcript for a particular conversation that includes the speaker. Sentence or phrase boundaries determined by various steps of the method 200 may be referenced so that the sentences and phrase within the transcriptions and the concurrent channel recording(s) are consistent. In some embodiments, training (270) a speech recognizer includes adaptively training an existing acoustic model to a change in environment, speaker, or channel.

In some embodiments, each of the concurrent channel recordings are trimmed according to their sentence or phrase boundaries in order to eliminate extraneous segments including extraneous utterances. For example, extraneous segments that correspond to background music or infomercials (e.g., that are played when a customer is placed on hold) may be trimmed from the concurrent channel recordings or omitted from training. The transcripts used in training the speech recognizer may also be pruned according to their sentence or phrase boundaries.

FIG. 3A is a text diagram depicting one example of a conversation 300 in accordance with at least one embodiment of the present invention. In the depicted example, a customer service agent interacts with a customer to produce the conversation 300. However, during a hold interval 310, the customer service agent places the customer on hold resulting in non-conversational periods within the conversation 300.

FIG. 3B is a text diagram depicting one example of an interleaved transcription 320 for the conversation 300. The interleaved transcription 320 includes speaker identifiers 322 and interleaves intervals where a speaker 'A' is speaking with intervals where speaker 'B' is speaking. The interleaved transcription 320, or a non-interleaved version thereof, may be used to generate conversation-specific language models for the each speaker that participates in the conversation 300.

FIG. 3C is a text diagram depicting one example of a recognized conversation 330 in accordance with at least one embodiment of the present invention. The depicted recognized conversation 330 is an example of speech recognizer output from a speech recognizer that processes concurrent audio recordings of the conversation 300 using conversation-specific language models (not shown) generated from the transcription 320 or the like. In the depicted embodiment, the recognized speech is separated by speaker (i.e., recording channel). Consequently, determination of the sentence or phase boundaries from the recognized speech is difficult.

The recognized conversation 330 may include extraneous utterances 332 (shown as underlined text) that correspond to audio segments, such as infomercials, that are not transcribed into the transcription 320 or the like. In addition to extraneous utterances 332, there may be misrecognized utterances 334 corresponding to an omission (depicted) or error in speech recognition despite the use of a conversation-specific language model.

FIG. 3D is a text diagram depicting one example of a delimited transcription 340 in accordance with at least one embodiment of the present invention. The delimited transcription 340 includes boundary indicators 342 that indicate the start and end boundaries of phrases or sentences. In the depicted embodiment, the boundary indicators 342 indicate the speaker as well as a sequential index number for sentences or phrases spoken by each speaker. The start and end boundaries may be determined from punctuation within the transcription 320 (or the like) and/or by conducting grammatical analysis on the text of the transcription 320 (or the like).

Figure 4A:
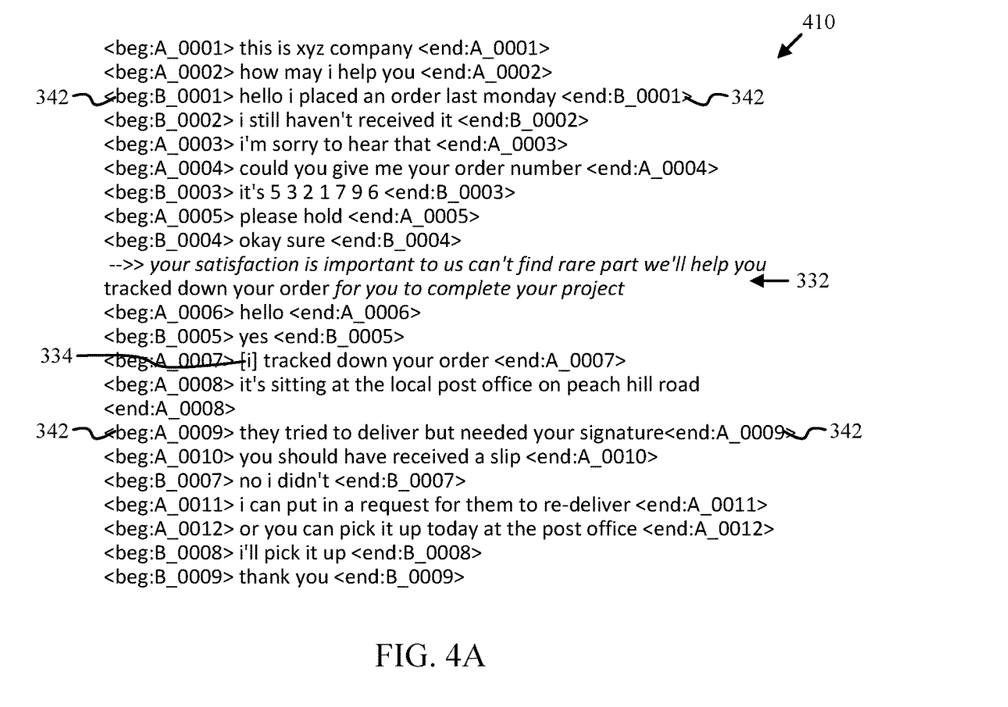
FIG. 4A is a text diagram depicting one example of a delimited recording in accordance with at least one embodiment of the present invention.

FIG. 4A is a text diagram depicting one example of a delimited recording 410 in accordance with at least one embodiment of the present invention. In the depicted example, the segmented recording 410 leverages written language alignment performed by a dynamic programming process to determine sentence or phrase boundaries 412 for the recognized conversation 340 as well as the audio recording(s) used to generate the recognized conversation 340.

Written language alignment also enables identification of the extraneous utterances 332 contained within the recognized conversation 340 and the corresponding audio recording(s). Once identified, the extraneous utterances 332 may be omitted from the acoustic model training process. For example, in the depicted embodiment a portion of the extraneous utterance 332, namely "track it down in order" is misrecognized as a "tracked down your order" due to the highly biased conversation-specific language model. However, since the misrecognition is outside the sentence or phrase boundaries, it is omitted from the acoustic model training process. In addition to extraneous utterances 332, the delimited recording 410 may have misrecognized utterances 334.

Figure 4B:
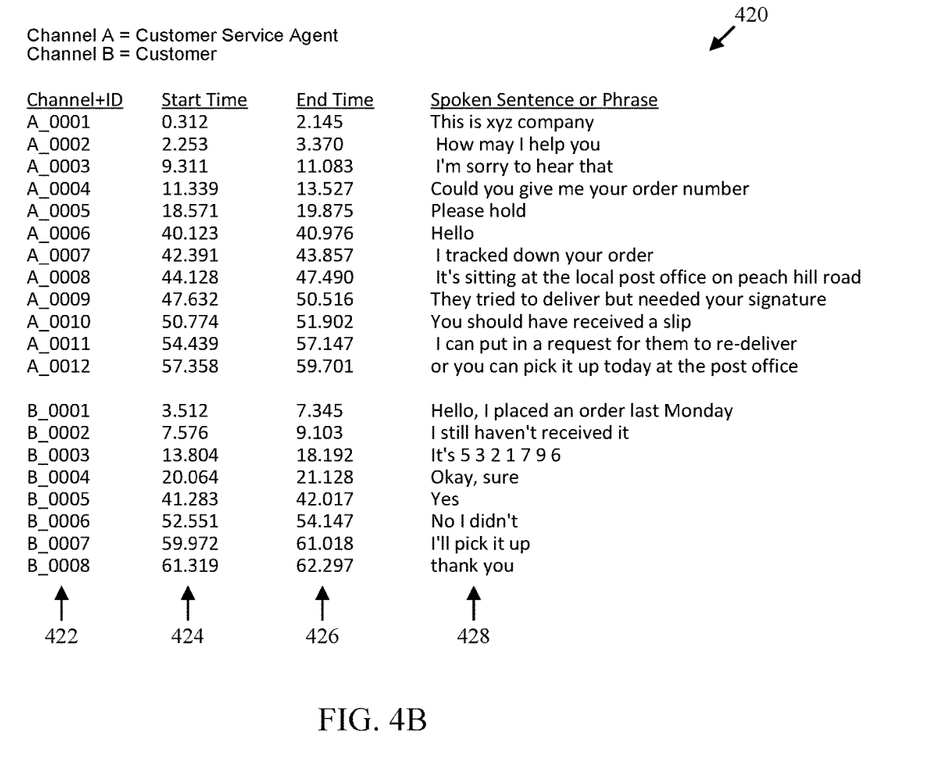
FIG. 4B is a text diagram depicting one example of acoustic training data in accordance with at least one embodiment of the present invention.

FIG. 4B is a text diagram depicting one example of acoustic training data 420 in accordance with at least one embodiment of the present invention. As depicted, each row of the acoustic training data includes a sentence or phrase identifier 422, a start boundary indicator 424, an end boundary indicator 426, and a spoken utterance string 428. The acoustic training data 420 indicates the speaker, content, and position of spoken sentences or phrases within the audio recording(s) that are to be used for acoustic model training. The spoken utterance string 428 may be the same as a sentence or phrase from the delimited transcription 340.

Using sentences or phrases from the delimited transcription 340 may replace the misrecognized utterances 334 with corrected speech. Furthermore, when there is a discrepancy between the human transcript and the speech recognizer output, confidence scores or heuristics can be used to determine the best representation of the spoken sentence or phrase. For example, natural speech insertions such as "um" and "ah" may be included in the recognizer output when such insertions are not included in the transcript. Additionally, discrepancies may be used to reject phrases from the training corpus that may be inferior for training. Sentences with a very high discrepancy may be entirely omitted.

One of skill in the art will appreciate that the embodiments disclosed herein enable generation of precise acoustic model training data based on sentences or phrases without requiring human segmentation of audio recordings. One of skill in the art will also appreciate that the embodiments disclosed herein enable adaptive or dynamic training to new domains, environmental conditions, and channel changes such as a new audio codec.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
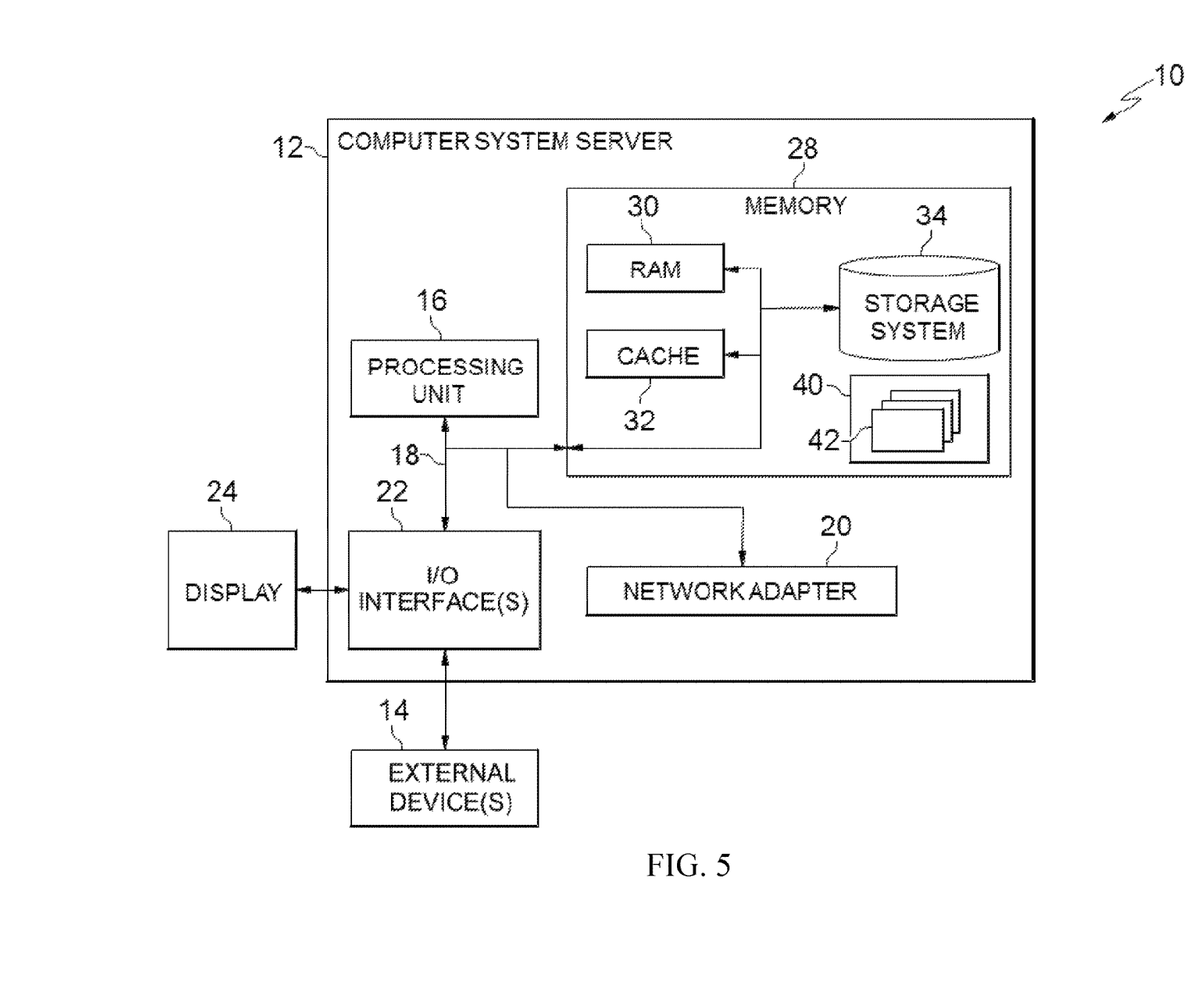
FIG. 5 is a block diagram depicting one example of a computing apparatus (e.g., cloud computing node) suitable for executing the methods disclosed herein.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
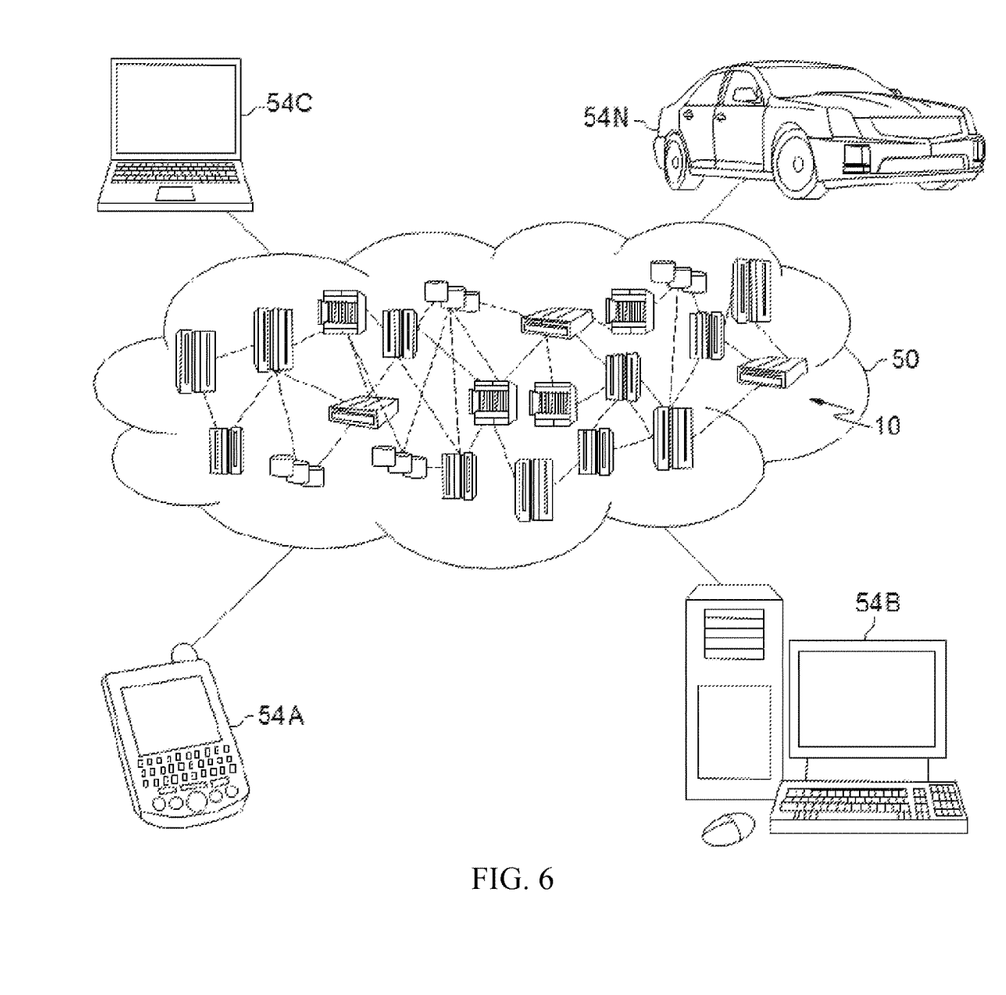
FIG. 6 depicts a cloud computing environment in accordance with to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
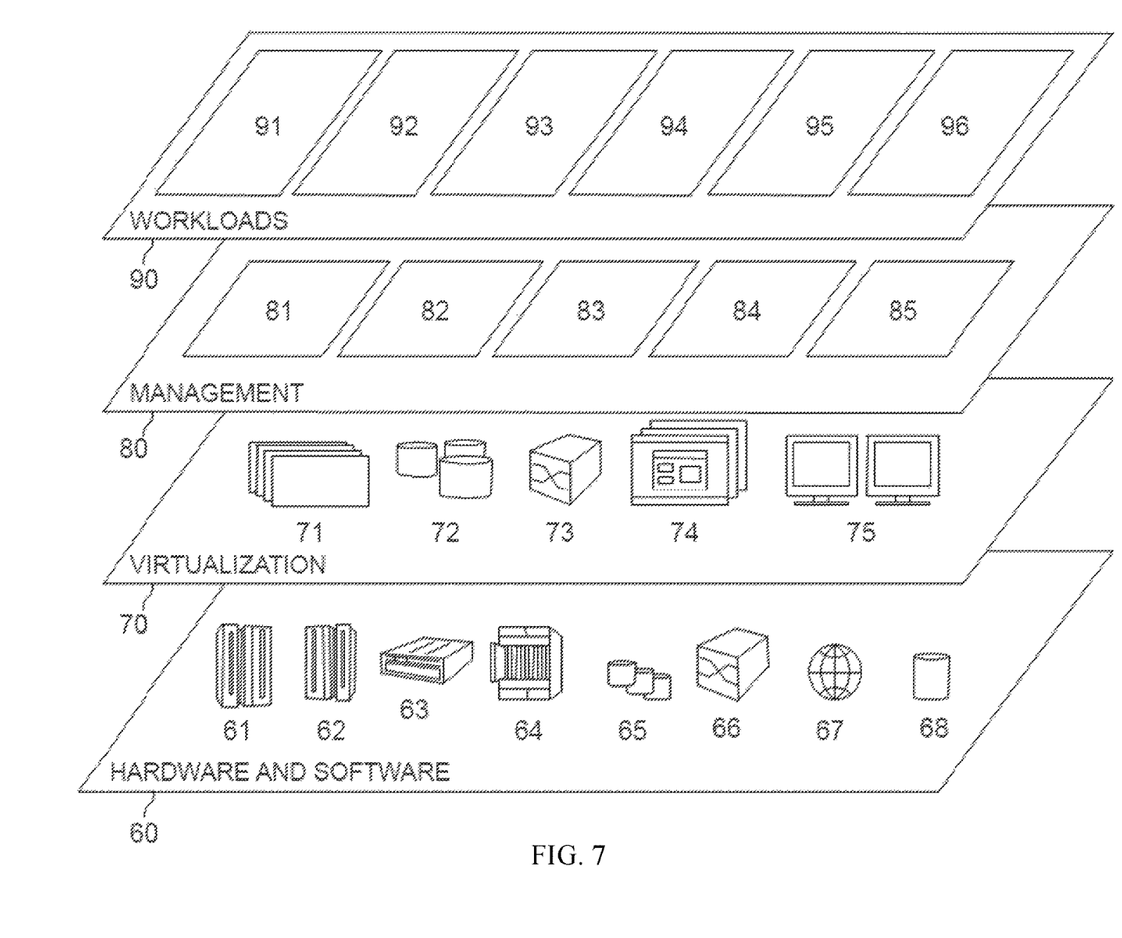
FIG. 7 depicts abstraction model layers in accordance with at least one embodiment of the present invention.

Referring now to FIG. 7, a set of functional abstraction layers provided by cloud computing environment 50 (FIG.

6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
one or more computer processors;
one or more computer readable storage media and program instructions stored on the one or more computer readable storage media, the program instructions comprising instructions to perform:
receiving a channel recording corresponding to a conversation;
receiving a transcription for the conversation;
generating a conversation-specific language model for the conversation using the transcription;
conducting speech recognition on the channel recording using the conversation-specific language model to provide time boundaries and written language corresponding to utterances within the channel recording;
determining sentence or phrase boundaries for the transcription;
aligning written language within the one or more transcriptions with the written language corresponding to the utterances with the channel recording to provide sentence or phrase boundaries for the channel recording; and
training a speech recognizer according to the sentence or phrase boundaries for the transcription and the sentence or phrase boundaries for the channel recording.

2. The computer system of claim 1, wherein the conversation corresponds to providing customer service.

3. The computer system of claim 1, wherein conducting speech recognition on the channel recording comprises interpolating between the conversation-specific language model and a general language model.

4. The computer system of claim 1, wherein the sentence or phrase boundaries for the channel recording are determined without manual segmentation or silence-based automatic segmentation of the channel recording.

5. The computer system of claim 1, wherein training the speech recognizer comprises training an acoustic model using a channel recording and a corresponding transcript.

6. The computer system of claim 1, wherein aligning written language comprises conducting a dynamic programming procedure.

7. The computer system of claim 1, wherein the conversation-specific language models comprise an n-gram model where n is greater than or equal to 6.

8. The computer system of claim 1, further comprising trimming the channel recording according to the sentence or phrase boundaries for the channel recording.

9. A computer program product comprising:
one or more computer readable storage media and program instructions stored on the one or more computer readable storage media, the program instructions comprising instructions to perform:
receiving a channel recording corresponding to a conversation;
receiving a transcription for the conversation;
generating a conversation-specific language model for the conversation using the transcription;
conducting speech recognition on the channel recording using the conversation-specific language model to provide time boundaries and written language corresponding to utterances within the channel recording;

determining sentence or phrase boundaries for the transcription;

aligning written language within the one or more transcriptions with the written language corresponding to the utterances with the channel recording to provide sentence or phrase boundaries for the channel recording; and training a speech recognizer according to the sentence or phrase boundaries for the transcription and the sentence or phrase boundaries for the channel recording.

10. The computer program product of claim 9, wherein the conversation corresponds to providing customer service.

11. The computer program product of claim 9, wherein conducting speech recognition on the channel recording comprises interpolating between the conversation-specific language model and a general language model.

12. The computer program product of claim 9, wherein the sentence or phrase boundaries for the channel recording are determined without manual segmentation or silence-based automatic segmentation of the channel recording.

13. The computer program product of claim 9, wherein training the speech recognizer comprises training an acoustic model using a channel recording and a corresponding transcript.

14. The computer program product of claim 9, wherein aligning written language comprises conducting a dynamic programming procedure.

15. The computer program product of claim 9, wherein the conversation-specific language models comprise an n-gram model where n is greater than or equal to 6.

16. The computer program product of claim 9, further comprising trimming the channel recording according to the sentence or phrase boundaries for the channel recording.

* * * * *